United States Patent [19]
Wennes

[11] 3,827,685
[45] Aug. 6, 1974

[54] CAM STOP POSITIONING APPARATUS
[75] Inventor: Stephen B. Wennes, Minneapolis, Minn.
[73] Assignee: Dayton Rogers Manufacturing Company, Minneapolis, Minn.
[22] Filed: Sept. 22, 1972
[21] Appl. No.: 291,157

[52] U.S. Cl................................. 269/229, 269/231
[51] Int. Cl.......................... B25b 5/04, B25b 5/16
[58] Field of Search .......... 269/196, 198, 199, 200, 269/217, 229, 231, 236

[56] References Cited
UNITED STATES PATENTS
1,375,312   4/1921   Nicol ................................ 269/236

FOREIGN PATENTS OR APPLICATIONS
929,554   11/1947   France ............................... 269/231
648,519   1/1951   Great Britain ..................... 269/236

Primary Examiner—Roy Lake
Assistant Examiner—E. F. Desmond
Attorney, Agent, or Firm—H. Dale Palmatier; James R. Haller

[57] ABSTRACT

Apparatus for positioning a work piece on a machine tool surface, said apparatus having a variable cam edge for holding the work piece and a calibrated scale for accurately repositioning the work piece.

8 Claims, 5 Drawing Figures

PATENTED AUG 6 1974   3,827,685

CAM STOP POSITIONING APPARATUS

This invention is directed to a novel cam stop positioning device for enabling the accurate positioning of a work piece in relationship to a forming tool or other machine tool, and subsequently to enable adjustment of the relative position of the work piece by simply rotating the cam a prescribed amount. The invention enables the precise repositioning of a workpiece without the necessity of undergoing a lengthy setup procedure prior to a machining or forming operation. The invention is particularly useful in positioning work pieces of an odd or irregular shape, although it is equally effective in positioning work pieces of a regular or symmetric shape.

In the technology of machining and forming materials a work piece or material to be machined is conventionally mounted to a machine surface and the machining or cutting element is brought into contact with it by a system of mechanical levers and other components. Typically, one or several cutting operations are performed on the work piece and it is then repositioned with respect to the machine for subsequent operations. This repositioning heretofore required either a time consuming setup procedure or expensive precision alignment equipment. The present invention enables accurate positioning with an inexpensive and easily adjustable apparatus.

Other advantages of the invention will become apparent from the attached specifications and drawings, in which.

Figure 1:
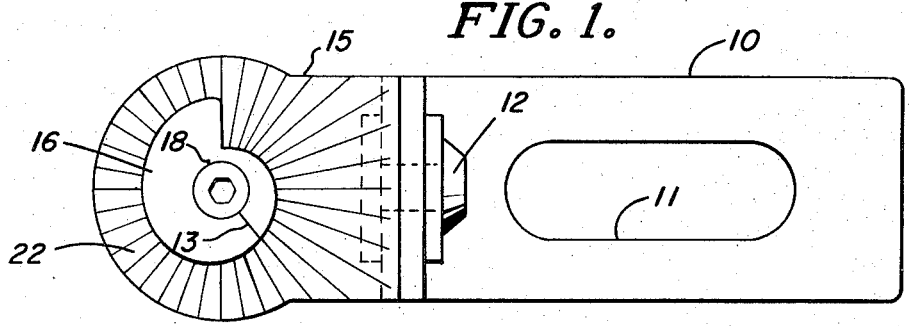
FIG. 1 is a top view of the invention.

FIG. 1 illustrates a top view of a preferred embodiment of the invention. An L-shaped mounting bracket 10 is used to clamp the invention to the surface of a work table or tool. Mounting bracket 10 has an elongated slot 11 to enable the bracket to be slidably positioned prior to tightening the mounting bolt which affixes the bracket. A second L-shaped cam bracket 15 is attached to mounting bracket 10 by means of a threaded bolt 12. Cam bracket 15 also has an elongated slot (not shown) for attaching bolt 12 to the bracket, to enable freedom of movement of cam bracket 15 in the vertical direction. Scribe marks are engraved in cam bracket 15 at convenient regular angular intervals. These scribe marks are used as an aid in rotational alignment of cam 16 relative to cam bracket 15. Cam 16 has a single scribe mark 13 on its top surface. The amount of rotation of cam 16 about its mounting bolt 18 can be easily ascertained by comparing the relative positions of scribe mark 13 with respect to the scribe marks on cam bracket 15.

In a typical embodiment the scribe marks on cam bracket 15 are placed at ten degree intervals about the hole in cam bracket 15 through which bolt 18 passes. Thus, the scribe mark 13 on cam 16 can be aligned to coincide with 36 angular positions formed by the scribe marks on cam bracket 15.

Figure 2:
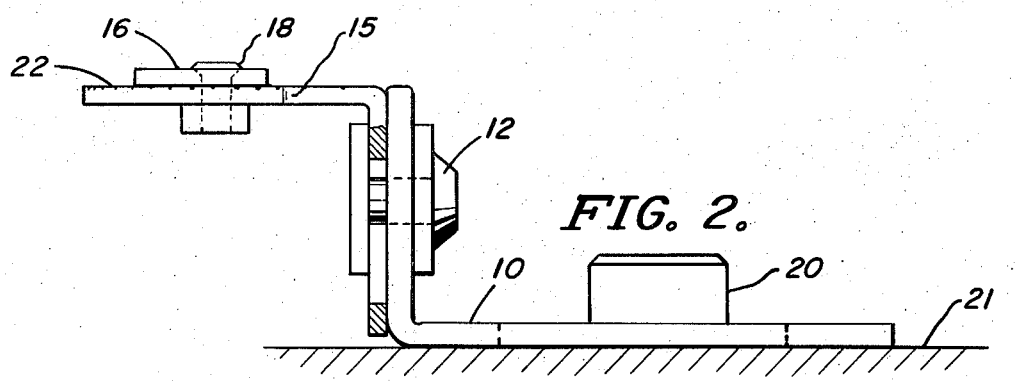
FIG. 2 is a side view of the invention.

FIG. 2 illustrates a side view of a preferred embodiment of the invention. Mounting bolt 20 is used to attach the entire apparatus to the work surface 21. Cam 16 can be adjusted in the vertical direction by loosening bolt 12 through mounting bracket 10 and cam bracket 15, and sliding cam bracket 15 upward or downward.

It is to be understood that the vertical adjustment features of the embodiment shown in FIG. 2 may not be necessary in some applications of the invention. If no vertical positioning is necessary the inventive cam stop positioning apparatus may be mounted on a flat mounting bracket rather than an L-shaped bracket such as mounting bracket 10. In such an application cam bracket 15 may be altogether eliminated and the scribe marks shown on cam bracket 15 placed directly on the flat mounting bracket. Of course, cam 16 is then also bolted to the flat mounting bracket.

Figure 3A:
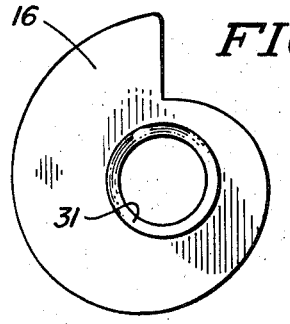
FIG. 3a is a top view of the cam stop portion of the invention.
Figure 3B:
FIG. 3b is a side view in cross-section of the same apparatus.

The shape of cam 16 is made so that the radial distance from the center of the cam mounting hole to the cam edge is proportional to the angle of rotation about an axis passing through the mounting hole. An enlarged view of cam 16 is shown in FIG. 3a. This cam design corresponds to a spiral of Archimedes, and is described by the equation $$R = A\theta$$

where
$R$ = radial distance from center of mounting hole
$A$ = constant
$\theta$ = angular rotation about an axis perpendicular to cam hole In one typical embodiment of the invention the design of cam 16 is chosen so that the cam edge has a 0.001 inch rise per degree of angular rotation. In this embodiment, the scribe marks on cam bracket 15 are made at 10 degree intervals. Therefore, a rotation of cam 16 so that its scribe mark 13 moves from one cam bracket scribe mark to the next cam bracket scribe mark results in a 0.010 inch rise in the cam edge surface. In a typical application the edge of cam 16 is mated against the edge of a work piece. Therefore, rotating cam 16 as described above results in a movement of the work piece of 0.010 inch. Also shown in FIG. 3a, and more particularly in FIG. 3b, is tapered hole 31. This hole receives bolt 18, which has a similar taper, and causes bolt 18 to always be centered in the cam hole.

A shoulder 22 (FIG. 2) is created by the outer edge of cam bracket 15 and the edge of cam 16. This shoulder is used for holding the work piece and enables the work piece to be slidably moved relative to cam bracket 15.

Figure 4:
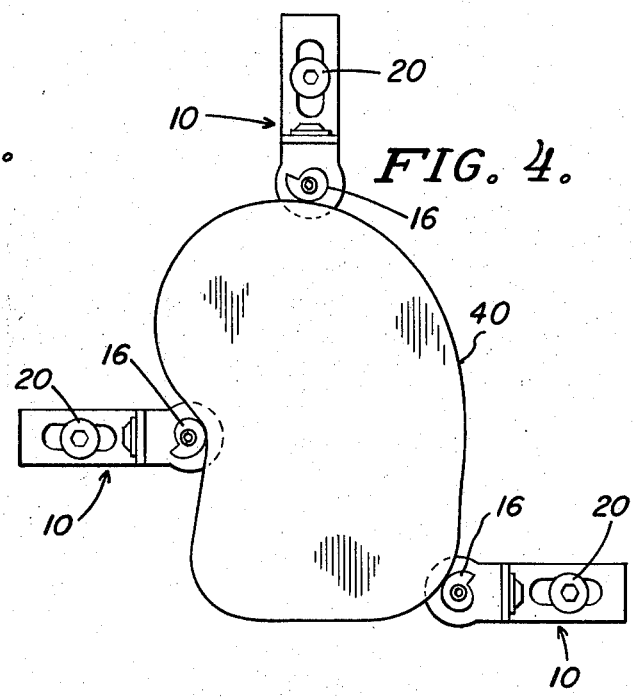
FIG. 4 illustrates a typical use of the invention in positioning a work piece.

FIG. 4 illustrates a work piece 40 positioned and held by three cam stop positioning devices. Each of the mounting brackets 10 are secured to the machine tool or work table surface by means of their mounting bolts. Each of the cams 16 are abutted an edge of their mounting bolts. Each of the cams 16 are abutted an edge of work piece 40. For a machining operation work piece 40 is securely held by cams 16. If it becomes necessary to reposition work piece 40 in either the X-or the Y direction various cams 16 may be loosened and selectively rotated to provide the degree of rotational change desired. The relative repositioning distance can be very precisely controlled in this manner.

Rotation of the cam 16 can be precisely accomplished by constructing a cam wrench having an interior clamping edge of the same size and shape as the cam edge. Although not necessary for practice of the invention, the wrench enables very precise control over rotation of cam 16. If, for example, a movement of 0.005 inch is desired the wrench will more easily enable the rotation of cam 16 so that the scribe mark on the cam moves only one-half of the distance between two bracket scribe marks.

Having described a preferred embodiment of the invention, which embodiment is not intended as a limitation on the scope of the invention, the scope whereoof has been described in the appended claims.

I claim:

1. Apparatus for slidably positioning a workpiece on a work surface, comprising:
   a. a rotatably adjustable cam for abutting an edge of said workpiece and having a mounting hole and cam edge partially described by the equation $R = A\theta$, where $R$ is the distance of the cammed edge from the center of the mounting hole, $A$ is a constant, and $\theta$ is the angular rotation of $R$ measured about the mounting hole;
   b. means for affixing said cam relative to said work surface and comprising a mounting bracket having a slot near one of its ends for receiving a bolt for clamping said mounting bracket to said work surface, and having a mounting hole near another of its ends for receiving a bolt for clamping to said cam mounting hole;
   said cam having at least one radial scribe mark and said mounting bracket having a plurality of radial scribe marks at regular angular intervals about said cam mounting hole.

2. Apparatus for slidably positioning a workpiece on a work surface, comprising:
   a. a rotatably adjustable cam for abutting an edge of said workpiece and having a mounting hole and a cam edge partially described by the equation $R = A\theta$, where $R$ is the distance of the cammed edge from the center of the mounting hole, $A$ is a constant, and $\theta$ is the angular rotation of $R$ measured about the mounting hole;
   b. means for affixing said cam relative to said work surface and comprising a first mounting bracket for attaching to said work surface, said bracket having a perpendicular end member; and a second L-bracket having one of its legs bolted to said perpendicular end member, and having a hole in the other of its legs for receiving a bolt for clamping through said cam mounting hole, said second L-bracket having a slotted hole for slidably mounting against said first mounting bracket.

3. A cam positioning device for accurate positioning of a work piece with respect to a mmachine tool and comprising a cam adjustable by rotation about its axis and having a cam edge for abutting the work piece, the radial distance from the cam axis to the cam edge being linearly proportional to the angle of rotation of the cam about the axis; means for affixing the cam relative to the machine tool; and means visually indicating increments of rotation of the cam.

4. A cam positioning device for slidably positioning a work piece on a work surface, comprising a cam adjustable by rotation about its axis and having a cam edge for abutting the work piece, the cam edge being partially described by the equation $R = A\theta$ where $R$ is the radial distance of the cam edge to its axis, A is a constant, and $\theta$ is the angular rotation of the cam about its axis; a mounting bracket for positioning the cam relative to the work surface, the mounting bracket and the cam having cooperating radial scribe marks indicating angular increments of rotation of the cam with respect to the mounting bracket.

5. A cam positioning device for slidably positioning a work piece on a work surface, comprising a cam rotatively adjustable about its axis and having a cam edge abutting the work piece, the distance from the cam edge to the axis being linearly proportional to the angle of rotation of the cam about the axis; a first L-shaped mounting bracket attachable to the work surface and having an end member perpendicular to the work surface; a second L-shaped bracket having one of its legs bolted through a slotted hole to the perpendicular end member of the first bracket to permit slidable movement between the brackets.

6. Apparatus for slidably positioning a work piece on a work surface, comprising:
   a. a rotatively adjustable cam for abutting an edge of said work piece and having a mounting hole and a cam edge partially described by the equation $R = A\theta$, where R is the distance of the cam edge from the center of the mounting hole, A is a constant, and $\theta$ is the angular rotation of the cam; and
   b. means for affixing the cam relative to the work surface and comprising a first L-shaped mounting bracket attachable to the work surface and having an end member perpendicular to the work surface, and a second L-shaped bracket having one of its legs bolted through a slotted hole therein to the perpendicular end member of the first mounting bracket to permit one bracket to slide relative to the other, the second bracket having a hole in the other of its legs for receiving a bolt for clamping through said cam mounting hole; the mounting bracket having a plurality of radial scribe marks at regular angular intervals about the cam mounting hole and the cam having at least one radial scribe mark alignable with the mounting bracket scribe marks to indicate increments of angular rotation of the cam.

7. The apparatus of claim 4, wherein the distance of the cam edge from the center of the mounting hole increases 0.001 inch per degree of angular rotation about the mounting hole.

8. The apparatus of claim 5, wherein said cam has at least one radial scribe mark and said mounting bracket has a plurality of radial scribe marks at regular angular intervals about said cam mounting hole.

* * * * *

UNITED STATES PATENT OFFICE
CERTIFICATE OF CORRECTION

Patent No. 3,827,685    Dated August 6, 1974

Inventor(s) Stephen B. Wennes

It is certified that error appears in the above-identified patent and that said Letters Patent are hereby corrected as shown below:

In column 3 line 14 after "and" and before "cam" insert -- a --;

In column 3 line 51 delete "mmachine" and insert -- machine --.

Signed and sealed this 7th day of January 1975.

(SEAL)
Attest:

McCOY M. GIBSON JR.
Attesting Officer

C. MARSHALL DANN
Commissioner of Patents